United States Patent [19]
Rutter et al.

[11] Patent Number: 5,654,794
[45] Date of Patent: Aug. 5, 1997

[54] PORTABLE LIGHT INTENSITY MONITORING SYSTEMS

[75] Inventors: Robert E. Rutter, Placitas; Timothy Towne Hewit, Albuquerque, both of N. Mex.

[73] Assignee: Devore Aviation, Albuquerque, N. Mex.

[21] Appl. No.: 372,245

[22] Filed: Jan. 13, 1995

[51] Int. Cl.$^6$ .................................................. G01B 1/00
[52] U.S. Cl. ........................................ 356/151; 250/214 R
[58] Field of Search .................................... 356/218, 213, 356/215, 219, 221, 222, 226, 121–123, 224, 151, 152.1; 250/214 B, 214 R, 206.1, 206.2, 205; 315/149, 150, 151; 340/981, 961, 941–942, 963, 970, 972, 974

[56] References Cited

U.S. PATENT DOCUMENTS

| | | |
|---|---|---|
| 1,545,627 | 7/1925 | Wohlers . |
| 2,329,427 | 9/1943 | Vossen . |
| 2,426,051 | 8/1947 | Reiber . |
| 2,651,963 | 9/1953 | Bischoff ................................ 356/121 |
| 2,927,170 | 3/1960 | Brown . |
| 3,052,878 | 9/1962 | Berry . |
| 3,366,835 | 1/1968 | Morris . |
| 3,541,504 | 11/1970 | Bush . |
| 3,588,816 | 6/1971 | Hines . |
| 3,624,629 | 11/1971 | Donaldson . |
| 4,181,960 | 1/1980 | Tateishi et al. . |
| 4,376,910 | 3/1983 | Peslier . |
| 4,572,987 | 2/1986 | Embrey et al. . |
| 5,035,064 | 7/1991 | Care . |
| 5,105,124 | 4/1992 | Futsuhara et al. . |
| 5,422,716 | 6/1995 | Dempsey ................................ 356/218 |
| 5,446,277 | 8/1995 | Rutter ................................ 250/214 R |

FOREIGN PATENT DOCUMENTS 1360619  7/1974  United Kingdom .................. 356/121

OTHER PUBLICATIONS

Henderson, Breck W., "Faa: Aircraft Strobe Lights May Fall Short of Standards," *Aviation Week & Space Technology*, pp. 42–43, Sep. 14, 1992.

Gradov, V.M., et al., "Theory of Powerful Nonsteady Xenon Discharge Taking Vaporization of its Stabilizing Walls Into Account," translated from *Teplofizika Vysokikh Temperatur*, vol. 19, No. 1, pp. 28–35, Jan.–Feb. 1981.

*Primary Examiner*—K. Hantis
*Attorney, Agent, or Firm*—DeWitt M. Morgan, Esq.; Kevin Lynn Wildenstein, Esq.

[57] ABSTRACT

A portable flash tube intensity monitoring system which includes: an internal power supply; a human eye spectral response photodiode for producing analog signals, each of which is directly proportional to the intensity of each flash from the flash tube; electronics for converting each of the analog signals to a digital time function proportional to the intensity of the corresponding flash; electronics, including a microprocessor, for monitoring the digital time function, for flagging a time function which is below a preselected minimum, for communicating status signals to a localized operator display when the time function is below the preselected minimum, and for testing of an internal power source; a fixed distance indicator which allows accurate measurement from a remote coordinate location; and an operator display. The monitoring system is preferably integrally formed for ease of use and portability. The fixed distance indicator advances a predetermined coordinate distance to actively engage the system, and also allows for an accurate measurement of the flash tube intensity.

14 Claims, 10 Drawing Sheets

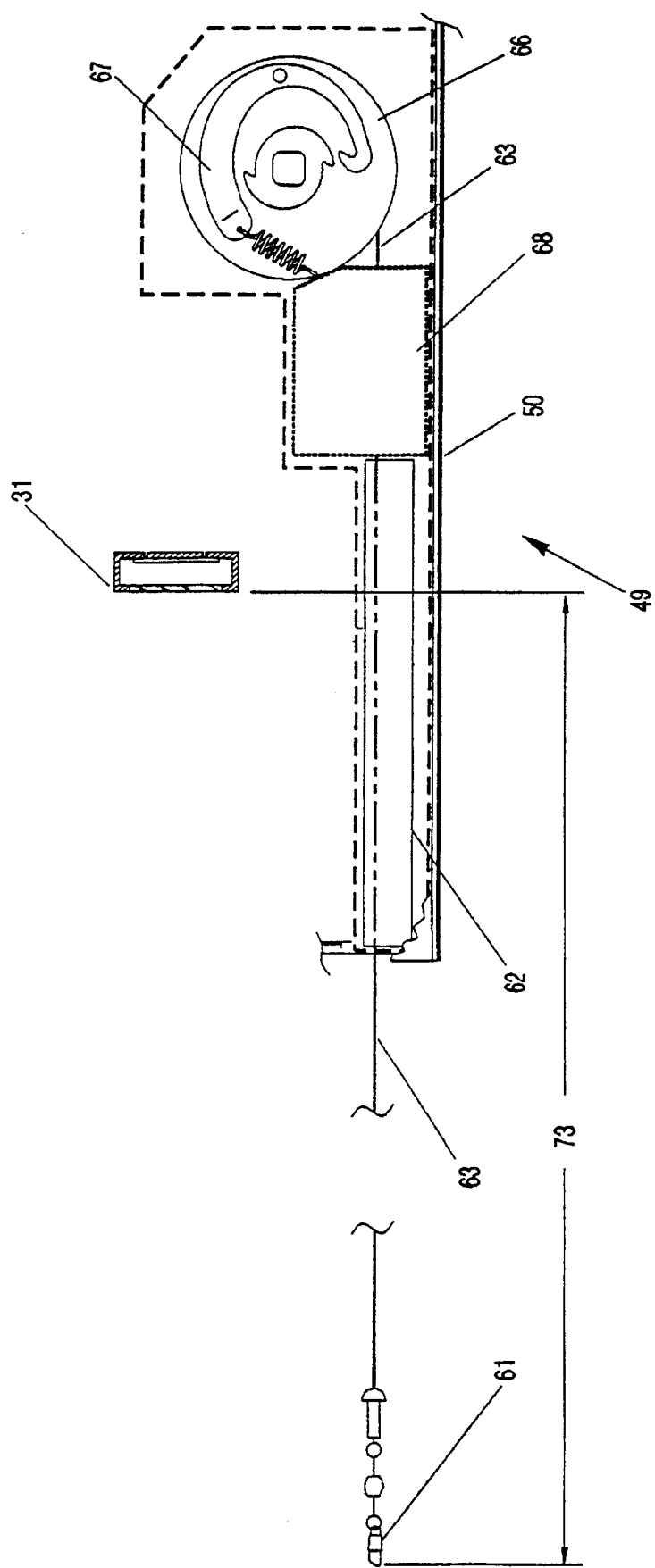

1

PORTABLE LIGHT INTENSITY MONITORING SYSTEMS

FIELD OF THE INVENTION

This invention relates to portable systems for monitoring and analyzing the intensity of illumination sources such as aircraft anticollision flash tubes and continuous incandescent lamps, and the method of using such systems.

BACKGROUND OF THE INVENTION

Flash tube technology is used for anticollision lights on aircraft. These tubes typically produce sudden, brilliant flashes of light that are much more conspicuous than other types of light sources. Current Federal Aviation Administration (FAA) mandated airworthiness standards require that such flash tubes have an effective intensity of 400 candela when viewed within 5 degrees of horizontal for aircraft certified after 1977. For aircraft certified before 1977 the requirement is 100 candela.

In a new anticollision light, the intensity of the flash tube will meet or exceed FAA brightness standards. Unfortunately, the intensity of the flash tube significantly degrades with use, long prior to actual tube failure. See: B. W. Henderson, "FAA: Aircraft Strobe Lights May Fall Short of Standards", Aviation Week & Space Technology, pp. 42–43, Sep. 14, 1992; and V. M. Gardov, et al., "Theory of Powerful Nonsteady Xenon Discharge Taking Vaporization of Its Stabilizing Walls Into Account", translated from *Teplofizika Vysokikh Temperatur*, Vol. 19, No. 1., pp. 28–35, January-February, 1981. The result is that most anticollision flash tubes continue in service in a substandard mode long after they have degraded below FAA minimum intensity requirements.

An FAA survey showed that airlines generally rely on the technical manuals from the flash tube manufacturers. Usually, manufacturers do not recommend checking brightness or regularly replacing flash tubes. See Henderson, *supra*. Because the intensity of a flash tube cannot easily be determined with any certainty with the human eye, airline maintenance personnel cannot easily identify non-complying anticollision lights in need of replacement.

For an anticollision light mounted on the body of an aircraft, it is critical that the light illuminate throughout the horizontal plane covering a 360 degree circumference around the aircraft. To best accomplish this requirement, flash tube manufacturers have universally adopted a flash tube 1 having a donut shaped portion 2 surrounding parabolic-shaped reflector 9. See FIG. 1. Unfortunately, this configuration does not allow a consistent illumination in the horizontal plane throughout 360 degrees. For example, the design of the flash tube anode 3 and cathode 5 forms a small gap 7 in the otherwise circular donut 2. This gap creates a natural "low spot" or "node," resulting in reduced illumination characteristics at this coordinate point. Nodes, similar to those resulting from the tube design, are detected when the intensity of the flash tube is measured circumferentially throughout the horizontal plane.

The node variable intensity phenomena described above is graphically depicted in FIG. 2. As can be seen, the radial light intensity varies throughout a 360 degree arc in the plane of donut 1. FIG. 2 also depicts the intensity units radially, ranging from 0 candela to 600 candela. As an example of the node variable intensity phenomena, FIG. 2 shows node occurrences at zero degrees, 90 degrees (corresponding to the location of gap 7 shown in FIG. 1) and 180 degrees.

The node problem is further intensified when, during normal operation, material within the flash tube erodes due to the high intensity discharge currents inherent in flash tube technology, resulting in flash tube degradation. The eroded material tends to deposit itself upon the glass wall of the flash tube, resulting in several darkened regions on the flash tube. This darkening effect occurs worst in the area around node 3 and cathode 5, an area already low in intensity due to the tube geometry.

Additionally, the particular design of the lens cover surrounding the flash tube may hinder the requirement of consistent illumination circumferentially around the aircraft. When glass lenses of a teardrop or other non-circular design are used for aerodynamic purposes, such as lens cover 15 (FIG. 1), the uniformity of intensity around the flash tube is further eroded by factors such as prismatic effects. Therefore, in normal operation, the lens cover aberration, in conjunction with the flash tube anomaly, may combine to produce a non-uniform light intensity pattern circumferentially around the light. Therefore, some of the node anomalies depicted in FIG. 2 are likely the result of either excess eroded material or lens cover design. At a minimum, node locations (if known) should be tested to conform to current FAA flash tube intensity guidelines. However, it is clearly best to test flash tube intensity 360 degrees circumferentially around the flash tube.

While FIG. 1 depicts a conventional flash tube 2, manufacturers produce various-sized flash tubes for placement on different locations throughout an aircraft's body (e.g., on the aircraft tail, underneath the aircraft fuselage, on top of the aircraft fuselage). As such, these various-sized flash tubes do not emit light which is precisely consistent in intensity. For example, a smaller flash tube used on an aircraft tail would not likely emit the same intensity as a larger flash tube placed underneath the plane.

One proposed solution to testing illumination is to measure a sample of anticollision lights over time to determine the mean time to failure for such lights. This approach is based on statistical probability, and is therefore subject to either replacement of lamps that are operating pursuant to FAA guidelines, or to leaving noncomplying lights on the aircraft. Clearly, this proposed solution provides no certainty of the performance of any individual lamp, may result in unnecessary and expensive lamp replacement, and is subject to probability error.

U.S. Pat. No. 3,366,835 to H. L. Morris discloses a circuit for indicating a flash tube failure when the monitored tube is located where it is not readily visible to the operator. The failure indicator includes a light conducting plastic rod 48 which extends from the vicinity of the flash tube 14 to a photocell 49. Photocell 49 is part of a circuit including relay 53, capacitor 54, contacts 55 and warning light 56. If the flash tube fails to light for a predetermined period, capacitor 54 does not recharge and relay 53 is de-energized. Contact 55 then closes and the indicator light 56 comes on.

Numerous other lamp failure indicators are disclosed in the prior art. See, for instance: U.S. Pat. No. 3,541,504 to R. H. Bush, which is described as a vehicle burn-out indicator; U.S. Pat. No. 3,588,816 to R. H. Himes; U.S. Pat. No. 3,624,629 to C. A. Donaldson; U.S. Pat. No. 4,572,987 to D. M. Embrey, et al.; and U.S. Pat. No. 4,376,910 to J. P. Pieslier.

Copending application Ser. No. 08/173,087 discloses an on-board flash tube monitoring system which includes: a human eye spectral response photodiode for producing analog signals; electronics for converting the analog signals to a digital time function proportional to the intensity of the corresponding flash; and electronics, for monitoring the digital time function and for sending a fault signal when the time function is below a pre-selected minimum. This system is incorporated into the anticollision light unit on-board the fuselage of an aircraft.

Strotek (Carson City, Nev.) claims to have developed an optical measuring system which can check flash tube intensity from outside the aircraft while they are on the ground. See, Henderson, *supra*.

Prior to the present invention, portable and hand held systems capable of providing an accurate measurement of flash tube intensity from outside the aircraft while the aircraft is at rest on the ground did not exist. The present system is self monitoring and requires minimal maintenance. It is also cost effective to the airline industry, requires no modifications to existing aircraft structures and is capable of monitoring at approved FAA guidelines.

The present invention provides a simple solution to the problem of accurate readings created by the phenomena of light, namely, that light intensity decreases as the square of the distance from the light source increases. Due to this phenomena, a key element of the portable unit of the present invention is its ability to quickly position its photo sensor relative to the flash tube at a precalibrated distance and to maintain such calibrated distance throughout the 360 degree testing arc. Of course, while this system can obtain intensity information from a various-sized flash tubes, it is also capable of obtaining intensity information from any continuous light source. Additionally, this system is, preferably, internally powered, requires minimal set up and can easily be used by airline industry personnel. Since this is a portable system, it is capable of conserving internal power such that repeated replacement of the internal power source is infrequent.

Thus, it is an object of the present invention to provide a portable system for the continuous monitoring of flash tubes, or continuous illumination sources, which will provide a fault signal or other indication when the intensity of the source being monitored falls below a predetermined value. Such a predetermined value may be set by a governmental regulatory agency such as the Federal Aviation Administration (e.g., such as an intensity value falling below 100 candela for planes certified before 1977, or, intensity value falling below 400 candela for plane certified during or after 1977).

It is another object of this invention to provide a portable monitoring system for flash tubes or continuous illumination sources which can accurately monitor fight intensity from a predetermined, fixed coordinate distance without interference from outside sources, such as natural and man-made light sources.

It is an object of this invention to provide a portable monitoring system for flash tubes, or continuous illumination sources, which is operational only when the system is at a fixed, predetermined distance from the light source to acquire, for instance, accurate flash tube intensity information. With the present invention, it is contemplated to utilize a fixed distance indicator which also energizes the monitoring system.

It is also an object of this invention to provide a portable continuous monitoring system for flash tubes, or continuous illumination sources, which is transportable, requires no outside power source, and is capable of monitoring its internal power supply, and notifying an operator of a low battery condition.

This invention improves both aircraft safety and reduces the costly replacement of lights in aircraft systems where, without applicant's monitoring system, lamps are either not replaced when necessary pursuant to governmental regulations, or lamps are unnecessarily replaced even if the lamp is operating within acceptable guidelines.

SUMMARY OF THE INVENTION

A portable flash tube intensity monitoring system including: an internal power source; a human eye spectral response photodiode for producing analog signals, each signal being directly proportional to the intensity of each flash from the flash tube; electronics for converting each of the analog signals to a digital time function proportional to the intensity of the corresponding flash; electronics, including a microprocessor, for monitoring each of the digital time functions, for determining the status of those time functions, for sending a signal to a display which is dependent upon the time function status, and for testing the operability of the internal power source; a fixed distance indicator, including an extensible cable coupled with an internal power switch; and an operator display. The monitoring system is, preferably, incorporated into single integral handheld unit for portability and ease of use.

The fixed distance indicator includes an extensible cable system capable of advancing to a preselected distance before monitoring commences, resulting in an accurate reading of the lamp intensity. The distance indicator further includes a recoil reel where the cable is stored, a centrifugal brake attached to the recoil reel to prevent rapid cable recoil, a swaged-on stop arranged to prevent further advancement of the cable beyond a predetermined length and an attachment device affixed to the end of the extensible cable which is used to attach the monitoring system to the light source. The fixed distance indicator also includes a switch actuator hinge, which, when engaged by the swaged-on stop, operates an adjacent power switch.

The electronics for converting the analog signals includes an analog to digital converter circuit, a calibration circuit and a microprocessor. The microprocessor serves several purposes. First, it looks for variations in flash intensity as seen by the photodiode. Second, it computes time function variations. Third, depending upon the time function information, the microprocessor sends an information signal to the operator display panel, thereby influencing the operator display panel readout. Fourth, upon engaging the system, it tests the internal power source for acceptable operation.

In use, the monitoring system is attached to an anticollision light on an aircraft. The operator will then pull the system away from the anticollision light until the system prevents further displacement. At this point, the monitoring system is activated, and the electronics employed such that flash tube intensity information is obtained from a precalibrated position. While it is best to test throughout 360 degrees, an operator should test known node locations.

BRIEF DESCRIPTION OF THE DRAWINGS

FIG. 5 is a sectional view of the fixed distance determination mechanism of the present invention;

DESCRIPTION OF THE PREFERRED EMBODIMENT

Figure 1:
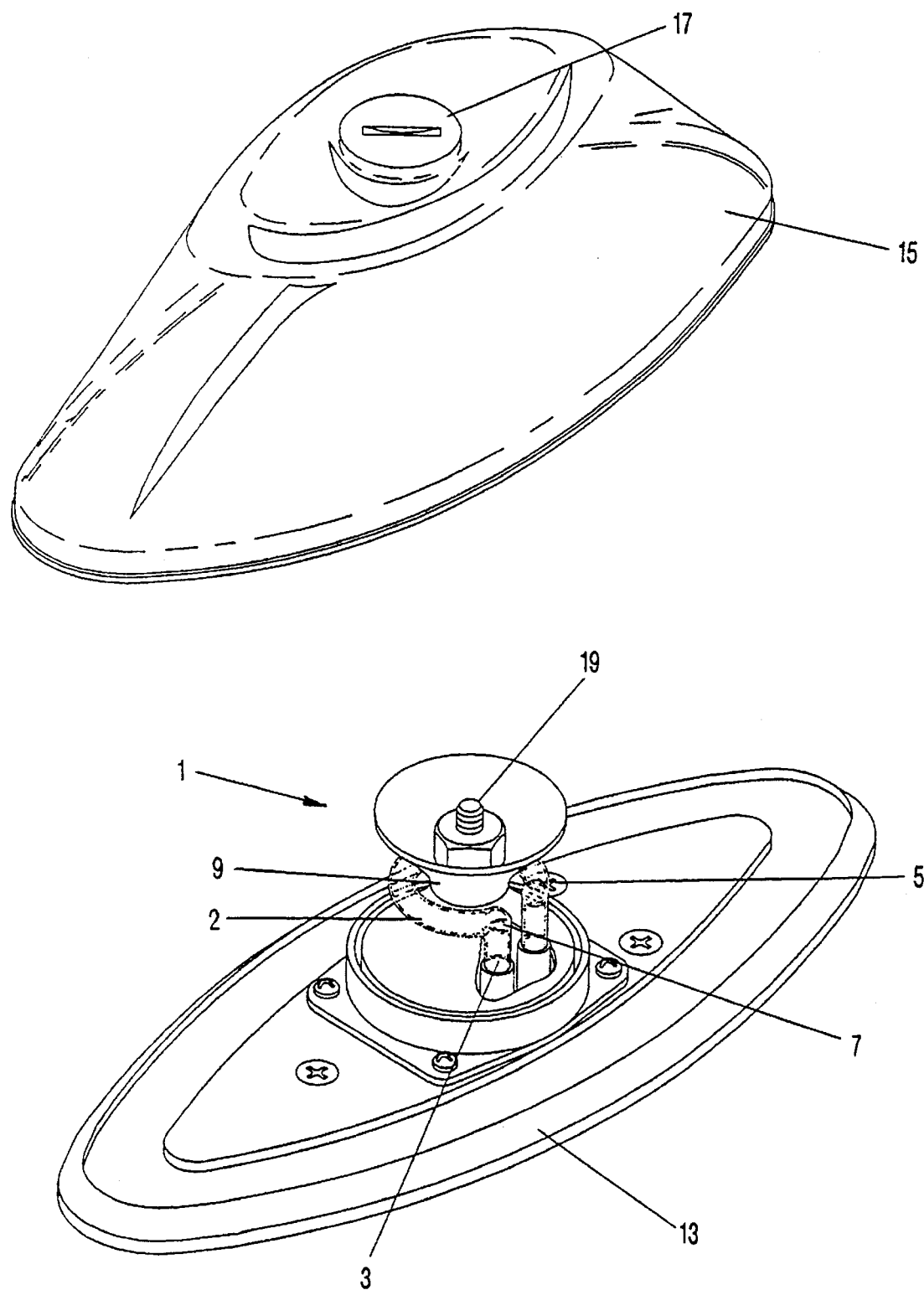
FIG. 1 is a perspective view of a conventional flash tube design characteristically employed by aircraft manufacturers.
Figure 2:
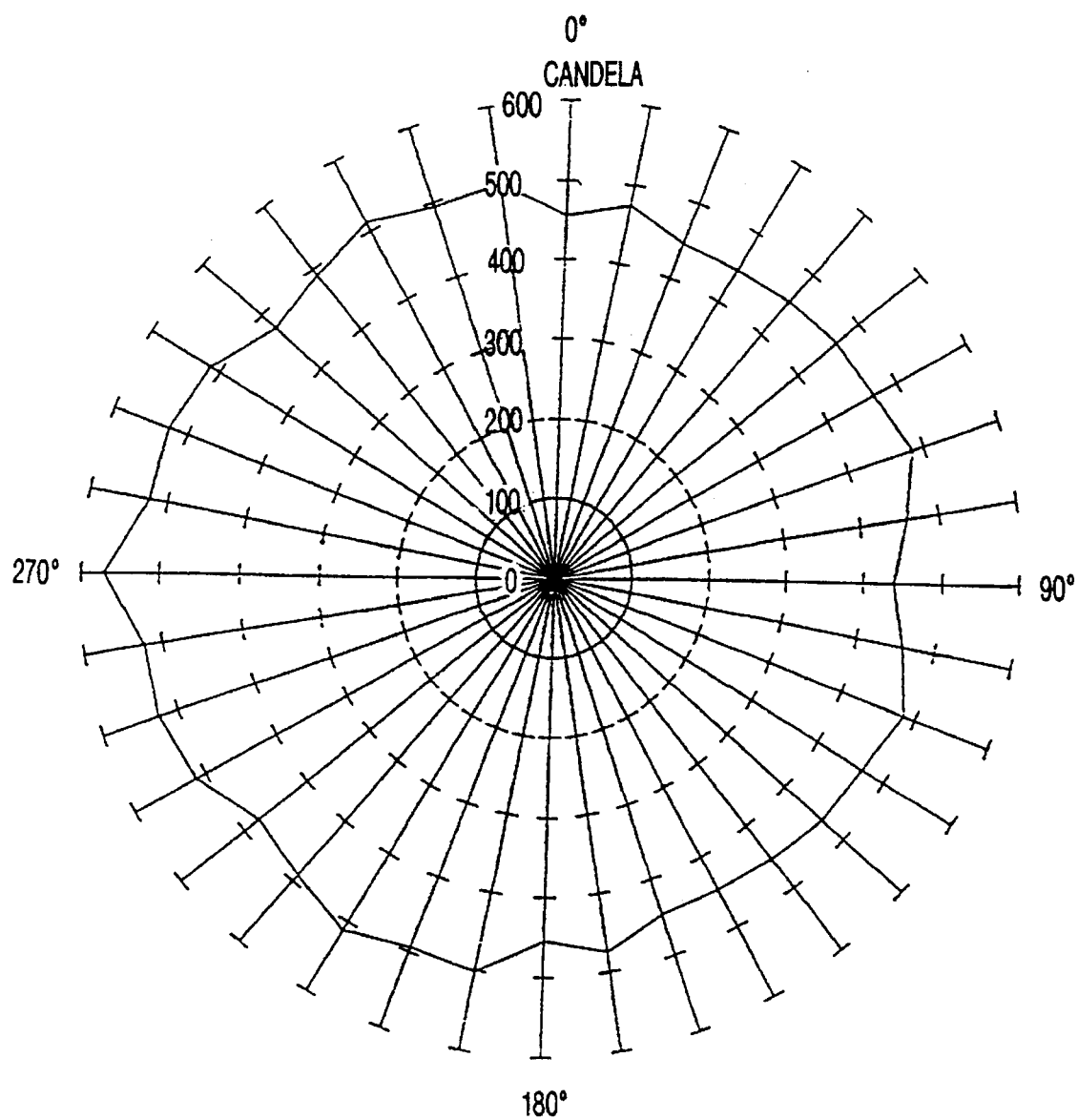
FIG. 2 is a graphical representation of the intensity emanating from a flash tube (such as illustrated in FIG. 1) over its 360 degree circumference.

FIG. 1 shows a conventional flash tube 1 having a donut portion 2, an anode 3, a cathode 5, and a parabolic-shaped reflector dish 9. As shown, anode 3 and cathode 7 converge towards housing 13, and are separated by a small gap 7. Lens cover 15 may attach to housing 13 through various conventional means, such as a fastener 17 having an internal thread (not shown) which mates with screw threads 19, to protect flash tube 1 from external damage.

Figure 3:
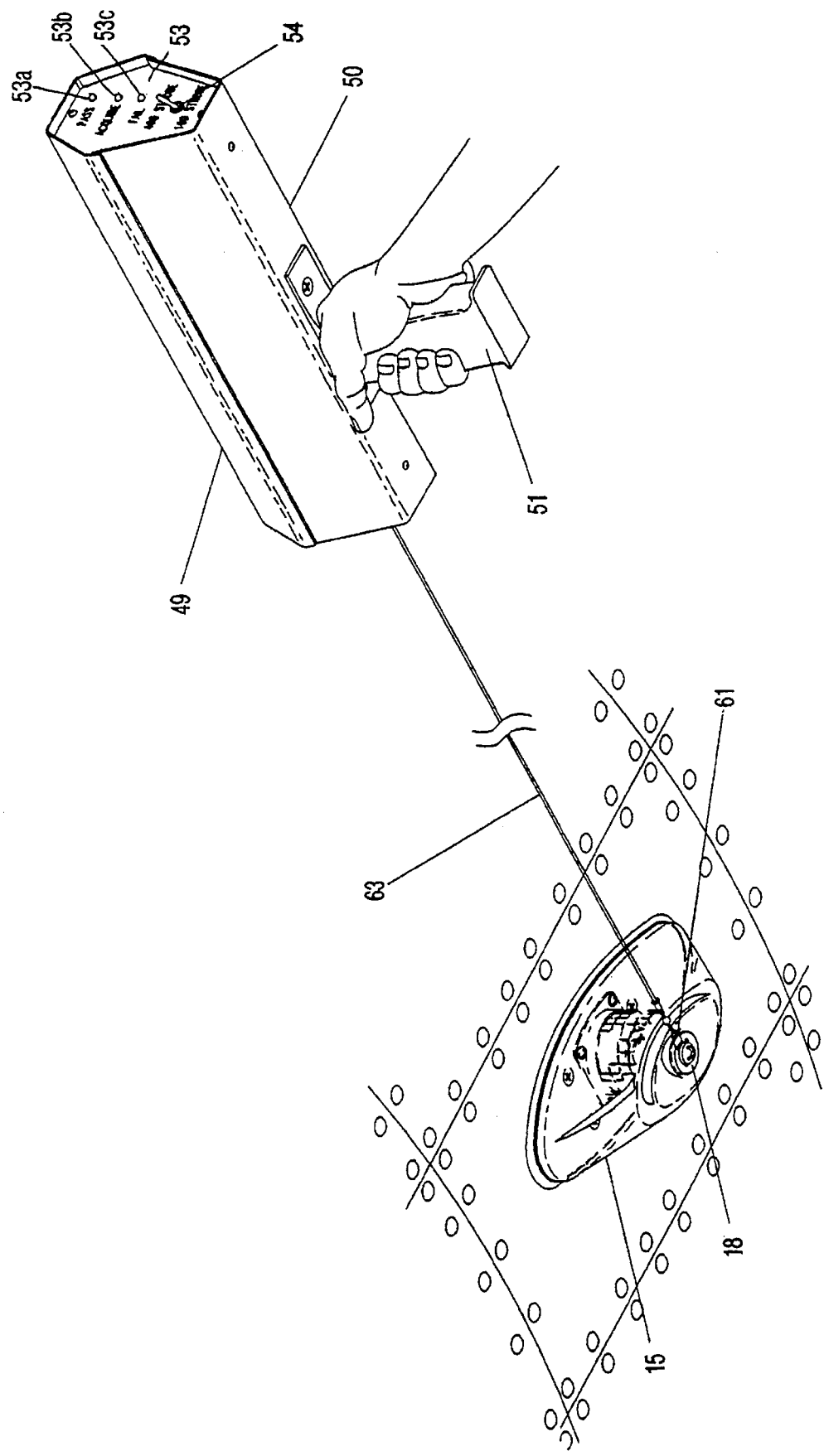
FIG. 3 is a perspective view of the preferred embodiment of the present invention in its operative position.
Figure 7A:
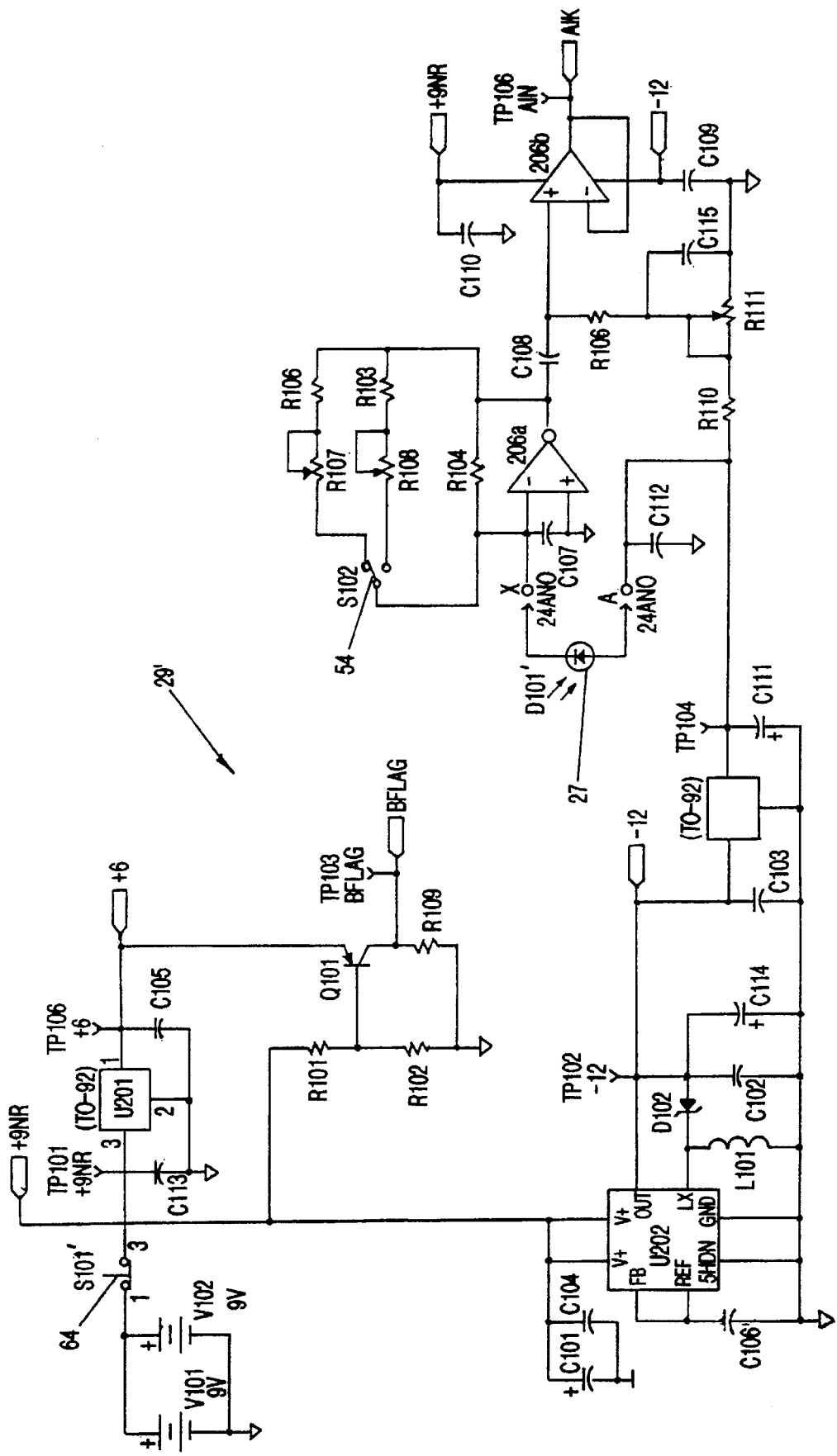
FIGS. 7a and 7b are schematics of an alternative embodiment of the electronics of the present invention.
Figure 7B:
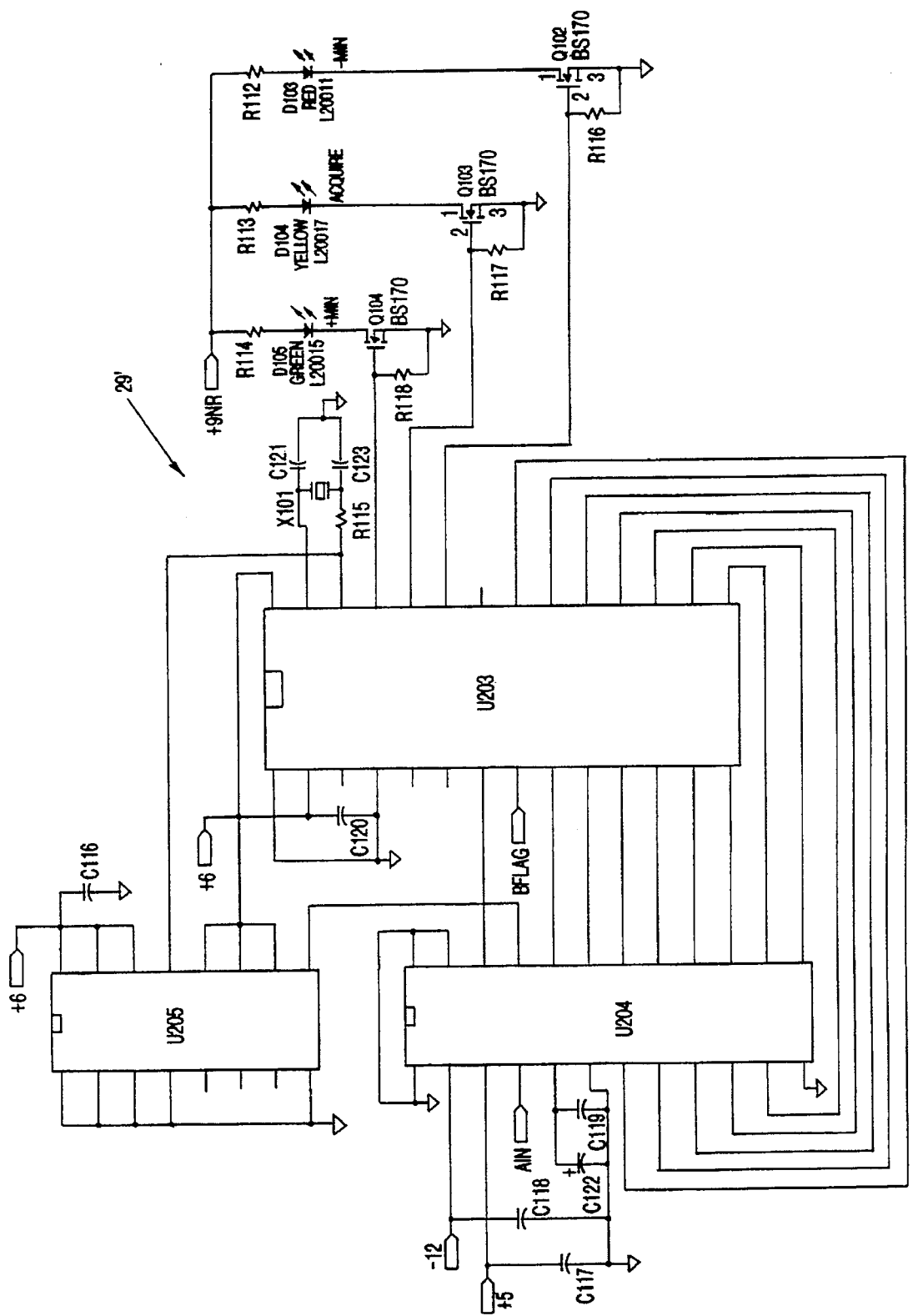
Figure 8:
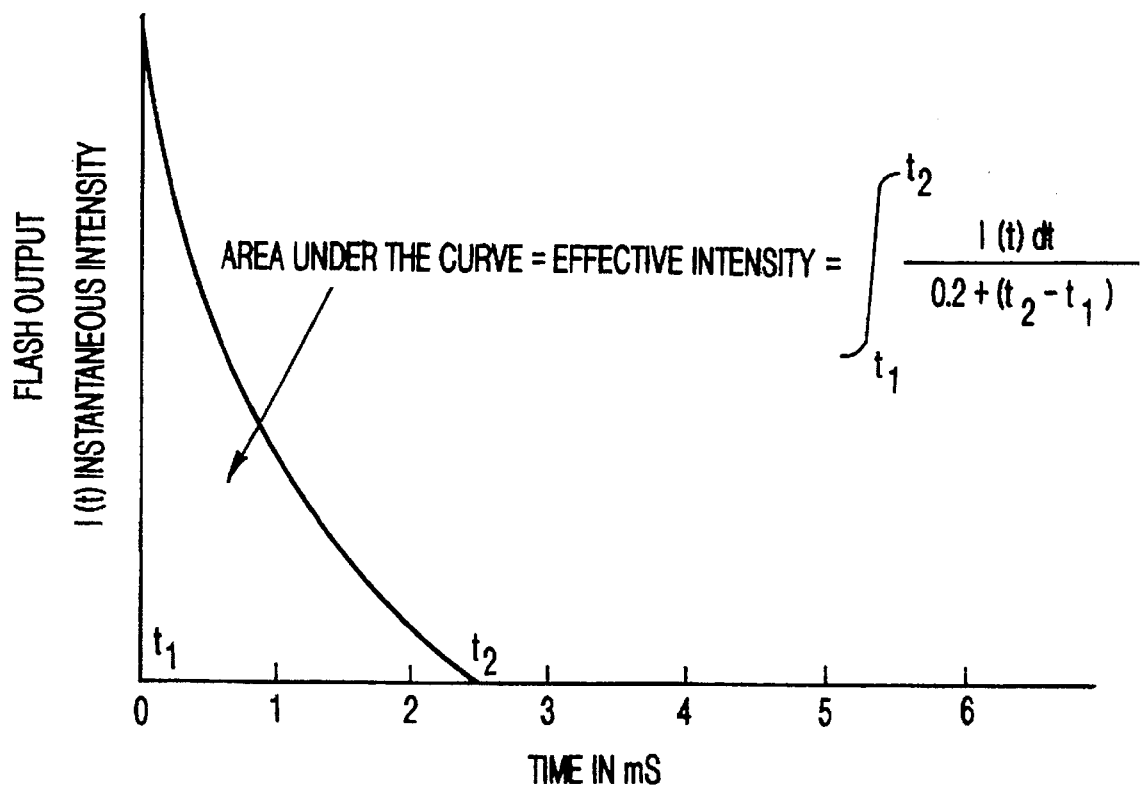
FIG. 8 is a timing diagram illustrating flash output v. time (in mS) for the flash tube.

The monitoring system 49, as shown in FIG. 3, includes a housing 50, handle 51, an operator display panel 53, toggle switch 54 (optional), and a retractable cable 63 to which, at one end, is attached to hook 61. In use, an operator attaches hook 61 to lens cover 15, and then by holding attached handle 51, displaces system 49 a predetermined distance 73 from lens cover 15. Display panel 53, as shown, employs three light emitting diodes of various color (depicted at 53a, 53b and 53c) to inform the operator of the relative intensity information obtained from flash tube 1. Display panel 53 will not display information until the monitoring system is at the predetermined distance from lens cover 15. When the unit is at this predetermined distance, display panel 53 will provide the operator with the necessary information to measure the relative light intensity emitted from the anti-collision light. While FIG. 3 shows lens cover 15 having a screw attachment 18 (which temporarily replaces fastener 17) upon which hook 61 attaches to lens cover 15, other lens covers used do not employ a fastener 17, so that attachment by hook 61 is impossible. In those instances, cable 63 will attach to lens cover 15 by use of a suction device (not shown). Finally, toggle switch 54, if incorporated as illustrated in FIGS. 7a and 7b, allows an operator to switch between measurement requirements, depending upon the year the plane was certified. This feature, as explained more fully below, obviates the necessity of employing two separate monitoring systems.

Figure 4:
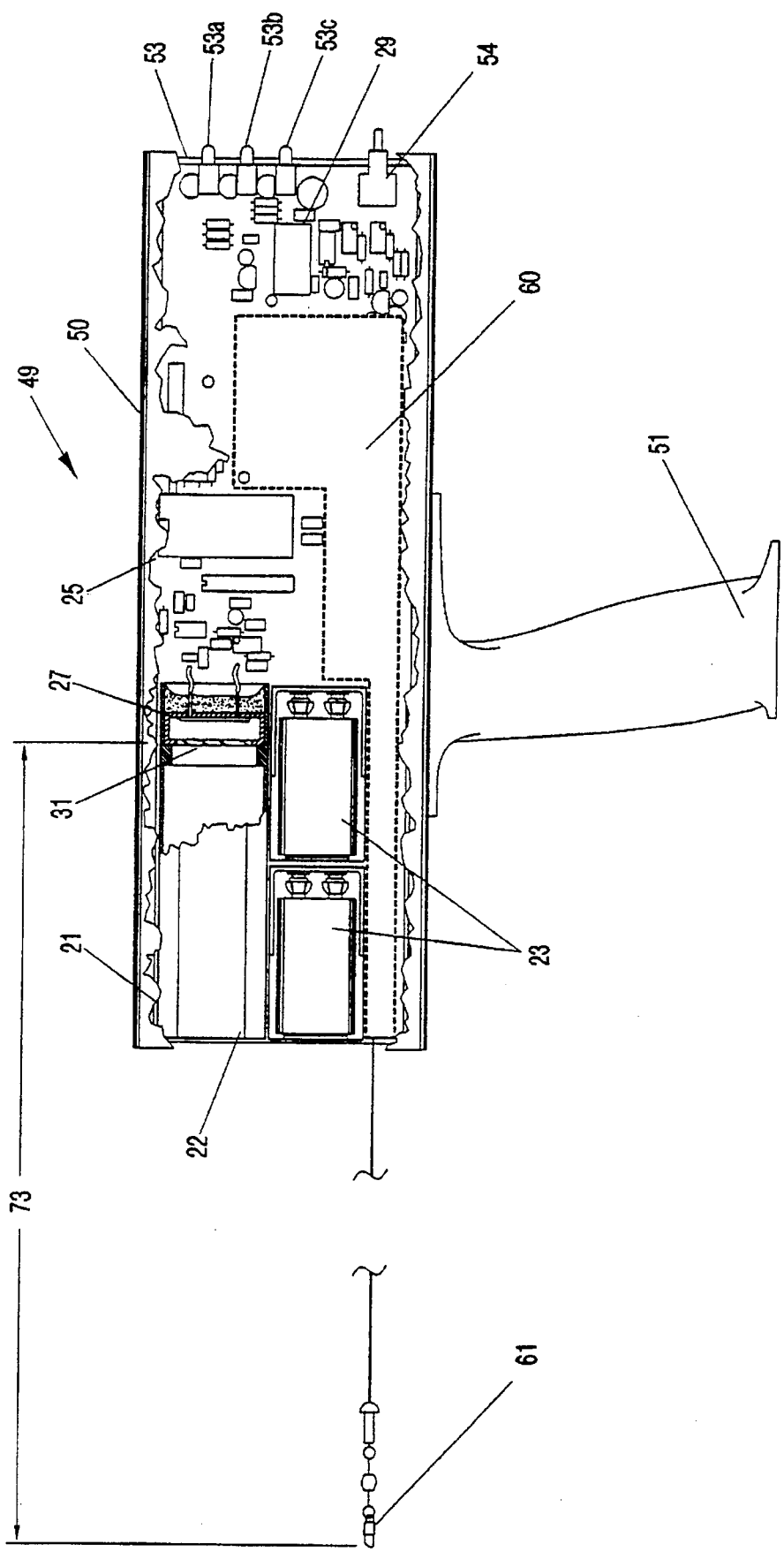
FIG. 4 is a sectional view of the preferred embodiment of the present invention.

FIG. 4 is a cross-sectional view of the intensity monitoring system 49 of the present invention. Monitoring system 49 includes a handle 51, and a housing 50, in which is mounted sensor block 21, power sources 23, display power source 25 (optional), photodiode 27, electronics board 29, optical filter 31, operator display panel 53 and fixed distance determination mechanism, generally indicated at 60.

Sensor block 21 includes a bored hole 22 to minimize the stray light from external sources (other than flash tube 1), such as sunlight or other man-made light, incident upon human eye spectral response photodiode 27. Conventional photodiode 27, which includes optical filter 31, is located at the internal end of hole 22.

Power source 23, which energizes monitoring system 49, is designed to accept conventional battery casings such as 9 volt batteries. Display power source 25, if incorporated, specifically provides power to light emitting diodes 53a, 53b, and 53c, and accepts conventional battery casings such as "AA" batteries. While the operator display panel 53 may include light emitting diodes, as indicated, those skilled in the art will appreciate that display 53 can also employ any conventional display apparatus such as a liquid crystal display unit, or diodes which are capable of alphanumeric readout. Also, in place of batteries, alternating current power can be used, in conjunction with a transformer.

Figure 5A:
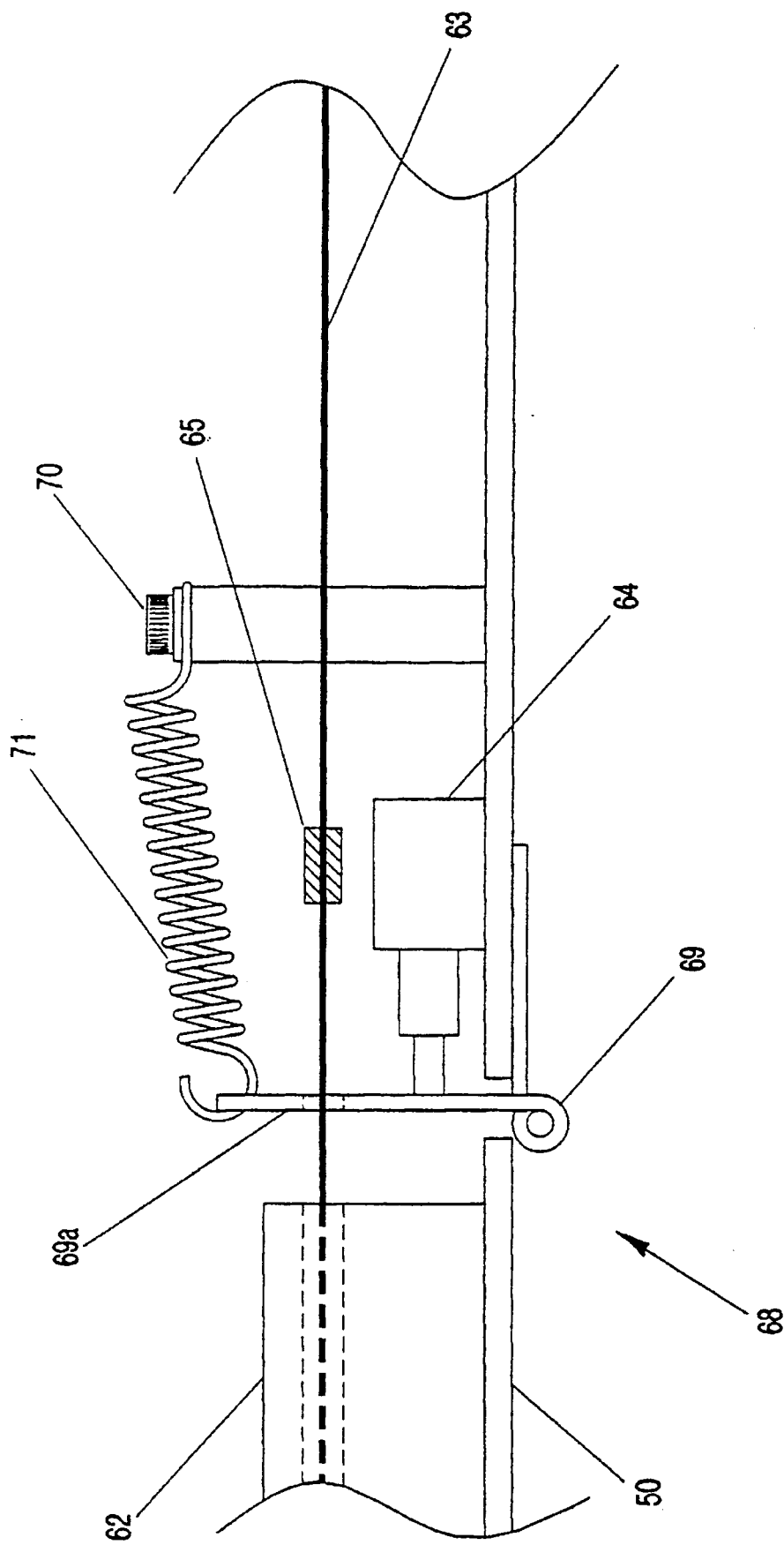
FIG. 5a is a sectional view of the triggering mechanism of the present invention.

As illustrated in FIG. 5, fixed distance determination mechanism 60 includes a conventional recoil reel 66, a conventional centrifugal brake 67 disposed on reel 66, and cable 63 attached to recoil reel 66 at one end. A cable attachment 61 is affixed to the other end of cable 63. Cable 63 also includes a swaged-on stop member 65 (shown in FIG. 5a) affixed upon cable 63 at a predetermined distance from cable attachment 61. Centrifugal brake 67 is adapted to prevent rapid cable recoil. Fixed distance indicator 60 also includes cable guide 62 (having a bore 62a) and trigger mechanism generally indicated at 68.

Trigger mechanism 68 shown in FIG. 5a, includes switch actuator hinge 69, switch 64, a post 70, and a spring 71. Switch actuator hinge 69 includes opening 69'a []to receive cable 63, and is normally retained in a switch closed position by spring 71, as illustrated. When cable 63 is withdrawn from the monitoring system, it passes through opening 69a on actuator hinge 69 until swaged-on stop 65 comes into contact with hinge 69, stop 65 being larger than opening 69a. With this contact, hinge 69 is shifted to the left (as viewed in FIG. 5a) into an open position, which releases switch 64 from an off position to an on position, thereby resulting in energizing the electronics board 29. When cable 63 is recoiled, stop 65 disengages hinge 69 such that hinge 69, under the bias of spring 70, depresses the actuation button of switch 64 to an off position, resulting in de-energizing electronics board 29.

Figure 6:
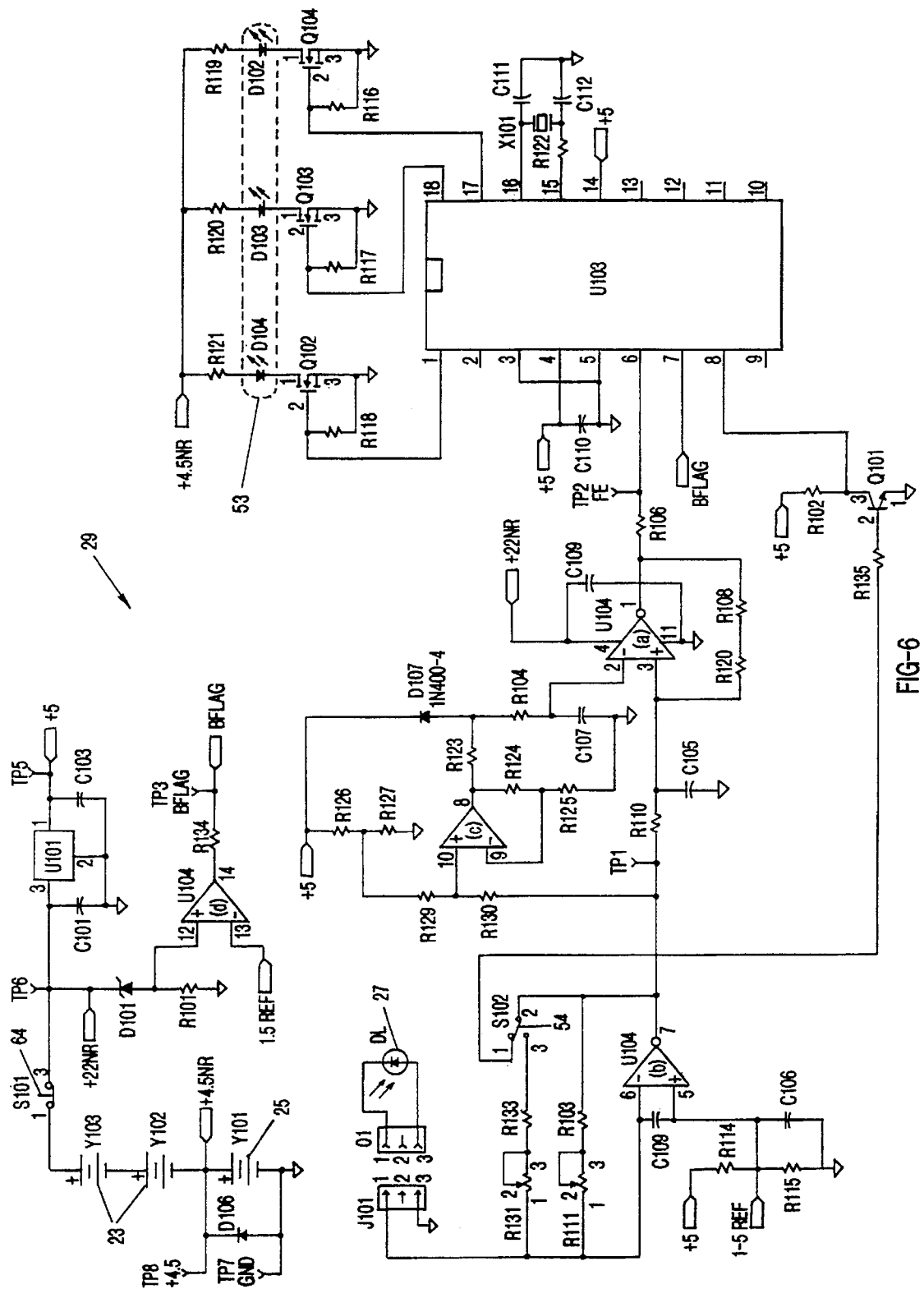
FIG. 6 is a schematic of the electronics of the present invention.

The design of electronics board 29 could, as those skilled in the art will appreciate, take a number of forms. As illustrated schematically in FIG. 6, electronics board 29 is powered from power source 23 (also designated as V102 and V103) through switch 64 (also designated S102) which is activated only when the system is at a proper measuring distance. Human eye response photodiode 27 (also designated as D1) is electrically designed to enhance response time, with a reverse bias voltage of at least 1.5 volts. The reverse bias voltage is generated by resistors R114 and R115, and applied to D1 by operational amplifier U104(b) through gain resistors R103 and R111. Resistor R110 and capacitor C105 form an integration network which is set for a time constant at least ten times the maximum flash pulse width. Operational amplifier U104(a) receives the integrated signal, and acts as a comparator between the integrated signal and a reference signal input into line 2 of operational amplifier U104(a). The network consisting of R104, R123, D127 and C107 removes the flash effect which may alter the characteristics of the integrated signal to provide for compensation of ambient or background lighting conditions. A digital signal is generated by operational amplifier U104(a) which corresponds to the intensity signal from a flash tube. This digital signal is input to microcontroller U103. Based upon the digital signal data, microcontroller U103 controls display panel D102, D103 and D104. Display panel D102, D103 and D104 (shown generally at 53) is powered by power source 25 (also designated as V101). Finally, diode D101, resistor R101 and operational amplifier U104(d) form a low battery voltage detection circuit which notifies microcontroller U103 if the battery reserve is insufficient for accurate operation. Additionally, in this embodiment, switch 54 (also designated S102) allows the selection of calibration testing between several measurement thresholds, but is not visible outside of housing 50.

An alternative electronic board schematic is depicted in FIGS. 6a and 6b. In this embodiment, electronics board 29' is powered from switch S101' which is activated only when the system is the a proper measuring distance, as previously discovered. U201 is a 5 volt linear regulator which is capable of transforming a 9 volts signal to 5 volts, which is required to operate the digital logic circuitry. The R101, R102 and Q101 network is a battery flag circuit, and sends a signal to microcontroller U203 when the battery source falls below a predetermined level, signifying a decaying battery. Conventional direct current inverter circuit U202 converts the 9 volts power supply to a regulated −12 volts signal. This −12 volts power signal energizes linear regulator U204 (which is a conventional high-resolution analog to digital signal converter). Conventional negative linear regulator U204 converts the −12 volts power to −5 volts, which is supplied to the anode of human eye response photodiode 27 (D101'). In order to generate a fast response time, photodiode D101' requires biasing (e.g, it must operate in a photoconductive mode). Amplifier U206a converts direct current from photodiode D101' to an analog signal. Switch 54 (S102) allows switching between 100 and 400 candela intensity measurements, and electrically changes the gain on operational amplifier 206a. The network defined by C108, R106 and C115 forms a direct current blocking network, which will allow flash tube intensity signals to pass through, but will minimize or completely prevent passage of steady state light signals (e.g., such as those emanating from natural or other man-made light sources). Unity gain buffer U206b conditions the analog signal. Analog to digital circuit U207 accepts the analog signal and converts it to a high resolution binary word. The binary word signals are then input to microcontroller U203. The network formed by X101, C121, C123 and R123 forms a 4 Mhz clock circuit which provides proper timing frequency for microcontroller U203. Since analog to digital circuit U204 requires half of the clock speed of microcontroller U203, conventional JK flip-flop U205 is employed to divide the clock frequency in half. Finally, D105, D104 and D103 are conventional light emitting diodes capable of operation with a 9 volts power source. Naturally, electronics board 29 and 29' is capable of operating in wide temperature oscillations to accommodate variable environments, either indoors or outdoors.

In operation, cable 63 of monitoring system 49 is attached to lens cover 15, and then monitoring system 49 is pulled away from lens cover 15 a distance 73 until the swaged-on stop 65 prevents further retraction of cable 63. While the specific distance 73 is not critical, once calibrated to photodiode 27 and electronics 29, it must be maintained. Thus, when monitoring system 49 is at this fixed, predetermined distance from the anticollision light, it is always activated. Upon activation, the electronics board 29 tests for sufficient reserve charge in the power source. If insufficient power is available, microcontroller U103 (or U203) will control all light emitting diodes 53a, 53b and 53c by flashing all three to warn the operator of such a condition.

In the preferred embodiment when the system is operational, microcontroller U103 (or U203) continuously communicates with display 53. In this regard, when the system is at a precalibrated position, microcontroller U103 (or U203) signals light emitting diodes 53a, 53b and 53c to flash, thereby notifying the operator that (s)he is at a correct distance from flash tube 1. In every instance of a flash occurrence, electronics board 29 (or 29') will detect the occurrence, and send a corresponding signal to diode 53b. In this regard, microcontroller U103 (or U203) energizes diode 53b to notify an operator that the system is operational. When a flash occurs, microcontroller U103 (or U203) de-energizes the display 53 for the period of the flash, and returns display 53 to an energized status when the flash is no longer detected.

The effective intensity of a strobe light is defined as an integral of the instantaneous intensity taken over the flash duration. With reference to FIG. 7, the analog signal from photodiode 27 is integrated and converted into a digital time function. Specifically, the analog signal is integrated into a binary function in which the time duration of the binary signal represents the effective intensity of the flash. For example, microcontroller U103 on electronics board 29 samples the binary signal after each flash. If the flash intensity is above the acceptable intensity (e.g., at or above 400 candela), microcontroller U103 will detect a binary true signal, and send a corresponding signal to the diode 53a. If the flash intensity falls below the required minimum, microcontroller U103 will detect a binary false signal and send a corresponding signal to the diode 53c indicating that flash tube 1 should be replaced.

Similarly, microcontroller U203 on electronics board 29' samples the binary signal after each flash. Microcontroller U203 will determine intensity information based upon the operator's selection of toggle switch 54. For example, if an operator is testing a plane certified before 1977, (s)he would make the appropriate selection on toggle switch 54. If the flash intensity is above the acceptable intensity (e.g., at or above 100 candela), microcontroller U203 will detect a binary true signal, and send a corresponding signal to the diode 53a. If the flash intensity fails below the required minimum, microcontroller U203 will detect a binary false signal and send a corresponding signal to the diode 53c indicating that flash tube 1 should be replaced. Of course, the terms "binary true" and "binary false" are relatve. Clearly, manipulation of these binary signals is simply a design choice rather than a design necessity.

Due to the characteristics of fixed distance indicator 60, the monitoring system is disabled when the system is moved outside of the predetermined range of the fixed distance indicator (e.g., either less than or granter than the distance 73 depicted in FIG. 4). In this event, the monitoring system is incapable of taking illumination measurements. Moreover, those skilled in the art can appreciate that accurate measurements cannot be made if the system is not pointed towards the light source.

Whereas the drawings and accompanying description have shown and described the preferred embodiment of the present invention, it should be apparent to those skilled in the art that various changes may be made in the form of the invention without affecting the scope thereof. For instance, with appropriate modification to electronics board, continuous light sources could also be monitored.

I claim:

1. A portable flash tube intensity monitoring system for monitoring the intensity of a flash tube installed in a structure such as an aircraft fuselage, said portable monitoring system comprising:

a. support means;

b. a human eye spectral response photodiode for producing analog signals, each of said analog signals being directly proportional to the intensity of each flash from said flash tube, said photodiode secured to said support means;

c. means for converting each of said analog signals to a digital time function proportional to said intensity of the corresponding one of each said flash, said converting means secured to said support means;

d. means for monitoring each of said digital time functions, said monitoring means secured to said support means; and e. means, secured to said support means, to repeatedly position said monitoring means, said photodiode and said converting means at a plurality of locations relative to said flash tube, said locations all having the same predetermined linear distance from but different angular orientations relative to said flash tube, whereby said monitoring system accurately measures the intensity of each said flash at said locations.

2. The monitoring system as set forth in claim 1, wherein said support means includes a housing.

3. The monitoring system as set forth in claim 1, wherein said positioning means includes an extensible cable having first and second ends and means, attached to said first end, to attach said first end adjacent to said flash tube.

4. The monitoring system as set forth in claim 3, wherein said positioning means includes a recoil reel attached to said second end.

5. The monitoring system as set forth in claim 3, further including a switch for energizing said monitoring means and said converting means, and a stop secured to said cable, said stop engaging said switch when said cable is extended said predetermined linear distance.

6. The monitoring system as set forth in claim 5, further including means secured to said support means for preventing further extension of said cable once said switch is engaged by said stop, whereby, so long as said means to attach is secured adjacent to said flash tube, said support means and said photodiode cannot be moved further away from said flash tube once said switch is engaged.

7. The monitoring system as set forth in claim 2, further including a handle attached to said housing, whereby said housing may be hand held.

8. The monitoring system as set forth in claim 1, further including a power supply.

9. The monitoring system as set forth in claim 8, wherein said power supply is secured to said support means.

10. The monitoring system as set forth in claim 1 further including a visual display means, secured to said support means, for indicating status of each said digital time function.

11. The monitoring system as set forth in claim 10, wherein said visual display means comprises a series of light emitting diodes.

12. The monitoring system as set forth in claim 1, wherein said monitoring means includes a microprocessor.

13. The monitoring system as set forth in claim 12, further including a power source and a visual display means, and wherein said monitoring means further includes means for determining the status of said digital time function, means for testing said power source, and a means for communicating a status signal to said display.

14. The monitoring system as set forth in claim 13, wherein said visual display means further includes a pass signal, a fail signal, and a flash tube acquired signal.

* * * * *

UNITED STATES PATENT AND TRADEMARK OFFICE
CERTIFICATE OF CORRECTION

PATENT NO. : 5,654,794
DATED : August 5, 1997
INVENTOR(S) : Robert E. Rutter, et al It is certified that error appears in the above-indentified patent and that said Letters Patent is hereby corrected as shown below:

| COLUMN | LINE | | SHOULD READ |
|---|---|---|---|
| 3 | 49 | "... accurately monitor flight intensity ..." | "... accurately monitor light intensity ..." |
| 6 | 24 | "... includes opening 69'a [ ] ..." | "... includes opening 69a..." |
| 7 | 47 | "... in Wide temperature ..." | "... in wide temperature ..." |
| 10 | 30 | "... flash tube acquired ..." | "... flash tube light acquired ..." |

Signed and Sealed this

Eleventh Day of November, 1997

Attest:

BRUCE LEHMAN

Attesting Officer    Commissioner of Patents and Trademarks